United States Patent [19]

Kretschmer

[11] Patent Number: 4,524,363

[45] Date of Patent: Jun. 18, 1985

[54] P2 POLYPHASE CODE EXPANDER-COMPRESSOR

[75] Inventor: Frank F. Kretschmer, Laurel, Md.

[73] Assignee: The United States of America as represented by the Secretary of the Navy, Washington, D.C.

[21] Appl. No.: 377,108

[22] Filed: May 11, 1982

[51] Int. Cl.³ .................... G01S 13/28; G06F 15/332
[52] U.S. Cl. ........................ 343/17.2 PC; 343/5 FT;
364/726
[58] Field of Search ................. 343/17.2 PL, 5 FT;
364/726

[56] References Cited

U.S. PATENT DOCUMENTS

| 3,176,296 | 3/1965 | Adams | 343/17.2 PC |
| 3,680,104 | 7/1972 | Westaway | 343/17.2 PC |
| 4,058,715 | 11/1977 | Niwa | 364/726 |
| 4,237,461 | 12/1980 | Cantrell et al. | 343/5 FT |

OTHER PUBLICATIONS

"Radar Handbook", M. I. Skolnik, Ed., pp. 35-15 and 35-16.

Primary Examiner—T. H. Tubbesing
Assistant Examiner—Gilberto Barrón, Jr.
Attorney, Agent, or Firm—Robert F. Beers; William T. Ellis; Alan P. Klein

[57] ABSTRACT

A pulse expansion and compression system, especially useful for radar ranging, comprising a pulse coder for expanding an input pulse and a pulse compressor of the matched-filter type. The coder consists of a plurality of delay stages into which the input pulse is fed, a discrete Fourier transform (DFT) circuit to which the output signals of the delay stages are fed by way of respective phase weights and for which every frequency port is phase-shifted prior to entry to a time-dispersion-means (TDM) comprising an arrangement of delay stages for differently delaying the output signals from the DFT. The TDM output is fed to a phase modulator and then to the transmitter.

The echo signals are conjugated, time-inverted, and passed through the same DFT as the input pulse signal by way of the phase weights. The outputs of the DFT are then phase-shifted at every frequency port and passed through the TDM, but this time in time-inverted order. The outputs of the TDM are fed through an envelope detector to provide a cross-correlated facsimile of the original input pulse.

7 Claims, 1 Drawing Figure

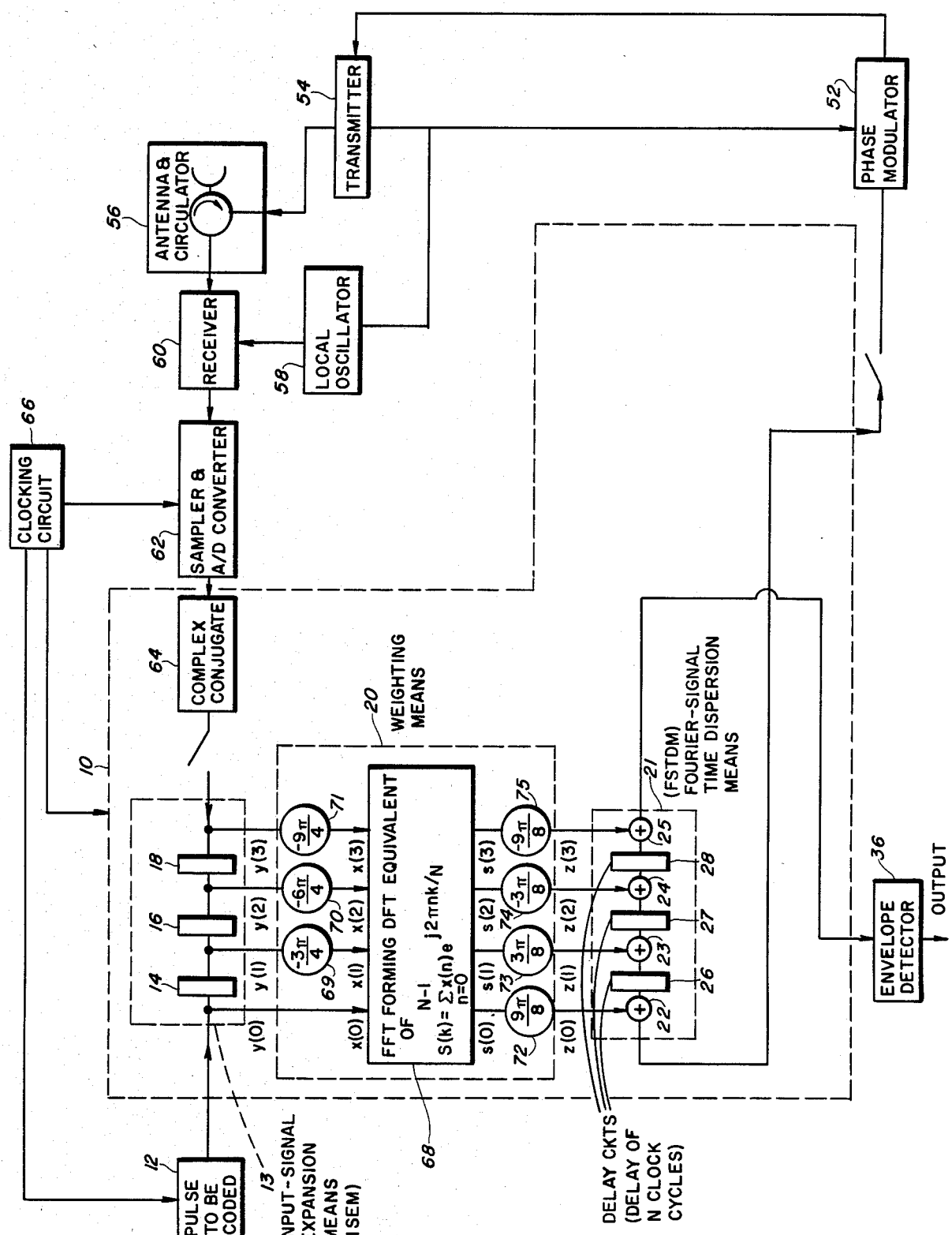

P2 POLYPHASE CODE EXPANDER-COMPRESSOR

BACKGROUND OF THE INVENTION

The invention relates to pulse-compression techniques, and more particularly to a pulse-compression technique using a fast Fourier transform circuit in a matched filter.

It is known to raise the average transmitted power of a given radar by expanding the pulse length and simultaneously keeping a constant bandwidth so that the range resolution capability of the radar is not reduced. To achieve this, a long pulse containing some sort of modulation is transmitted. Upon reception, the pulse is compressed to permit separation of adjacent range resolution cells.

One known form of modulation to effect pulse compression is phase modulation in which, within the width of the transmitted pulse, the phase is changed at specified intervals or subpulses. While these phase changes can follow a random sequence, by using certain well-defined sequences known as "Frank codes" it is possible to reduce the level of the sidelobes after processing of the received pulse.

A new uniform-amplitude polyphase code which is amenable to digital processing has been described in the paper "A New Class of Polyphase Pulse Compression Codes and Techniques" by B. L. Lewis and F. F. Kretschmer, Jr., IEEE Transactions on Aerospace and Electronic Systems Vol., AES 17, No. 3 (May 1981) pp. 364-370. This code is similar to the Frank polyphase code in many respects. The similarities include low sidelobe levels, good Doppler tolerance for search radar applications and ease of implementation. The new code is referred to as the P2 code. While the peak sidelobes of the autocorrelation function of the P2 code are the same as the Frank code for the zero Doppler case, the mean square sidelobes of the P2 code are slightly less (approximately 1 dB for a 16-element code decreasing with the pulse compression ratio).

The significant advantage of the P2 code over the Frank code is that it is more tolerant of receiver bandlimiting prior to pulse compression. Such bandlimiting will be encountered in radars employing digital signal processing. This bandlimiting is required to avoid out-of-band noise foldover caused by sampling in conversion to digital format.

A disadvantage of prior art digital pulse expander-compressors which use the P2 code is that they require a large amount of electronic hardware before significant results can be obtained and ways of reducing the amount of hardware have been sought, for example by taking advantage of the symmetry of the phases, which allows a savings of $(\frac{1}{2})N^2$ phase shifters or complex multipliers, where $N^2$ equals the pulse compression ratio or number of code elements. A discussion of prior art digital expander-compressors using the P2 code may be had by referring to U.S. patent application Ser. No. 143,399 by B. L. Lewis entitled "Pulse Compression System".

SUMMARY OF THE INVENTION

It is therefore an object of this invention to realize, for use with the P2 code, a digital pulse expander-compressor that requires a minimum amount of hardware.

This and other objects of the invention are achieved by a digital pulse-expander-compressor which includes a pulse coder means that provides, from a single input pulse, a series of weighted pulses having a time interval greater than the input pulse; and a pulse compressor means, of the matched filter type, that receives and processes echo signals corresponding to the output signals of the coder means. The pulse compression means includes weighting means which is the same as that employed in the coder means. The weighting means includes a discrete Fourier transform circuit; a first plurality of phase-shifters of which a respective phase-shifter is connected to every input of the discrete Fourier transform circuit except the first input; and a second plurality of phase-shifters, of which a respective phase-shifter of the second plurality is connected to every output of the discrete Fourier transform circuit.

This invention permits a minimum amount of hardware to be used to generate and compress the P2 polyphase code.

The total number of phase shifts in a FFT implementation of the discrete Fourier transform circuit is $N \log_2 N$, and 2N additional phase shifters are needed before and after the DFT. The total number of phase shifters needed using the techniques of this invention is then ($N \log_2 N + 2N$), whereas making use of the symmetrical phases, as many as $N^2/2$ phase shifters are needed using prior methods. Thus, for example, for a pulse compression ratio of 1024 (N=32), a savings of 224 phase shifters is achieved by this invention.

Additional advantages and features will become apparent as the subject invention becomes better understood by reference to the following detailed description when taken in conjunction with the accompanying drawings wherein:

BRIEF DESCRIPTION OF THE DRAWINGS

The sole FIGURE is a block diagram of an embodiment of the invention.

DESCRIPTION OF THE PREFERRED EMBODIMENT

The FIG. 1 shows a block diagram of the digital phase-coded pulse-expander-compressor of the invention as it might be used as part of a pulse-compression radar. The components of the invention are enclosed in the dashed lines. In brief, the system operates in the following manner. The input signal is a pulse produced by a pulse generator 12, for example. The pulse is clocked into an input-signal expansion means (ISEM) 13 providing three equal intervals of delay. The ISEM may comprise three stages 14, 16, 18 of a shift register or a delay line tapped at equal delay intervals, for example. Outputs are taken from the input to the first delay stage, the output of the first delay stage, the output of the second delay stage, and the output of the third delay stage, viz, y(0), y(1), y(2), y(3), respectively. During the first clock interval, the pulse to be coded is clocked out of the pulse generator 12 and put on the input line to the first delay stage 14; during the second clock interval the pulse at the input of the first delay stage 14 passes through the stage and appears at its output with the proper delay; and so on. The clocking circuit is shown in simplified form in block 66. The ISEM 13 essentially provides for time expansion of the input pulse. It provides four input signals to the weighting means 20 viz., 1000, 0100, 0010 and 0001, in a time which is four times as long as that of the input pulse. (Presence of a pulse is denoted by a 1, absence of a pulse by a 0.)

The signals y(0), y(1), y(2) and y(3) are fed into a weighting means 20 which provides four output signals, z(0), z(1), z(2), and z(3). The output signals from the weighting means 20 are individually fed to Fourier signal time-dispersion means 21(FSTDM). This comprises a plurality of adders 22–25, each coupled to a respective output of the weighting means 20 and a plurality of delay stages 26–28 interconnecting the adders. Each of the delay stages 26–28 supplies a delay equal to four clock intervals. Thus, signal z(0) has no delay, signal z(1) has a delay of four intervals, signal z(2) a delay of 8 intervals, and z(3) a delay of 12 intervals. The particular arrangement of the delays and the number of the delays is not fixed by any rule but is a matter of choice by the designer, the more delays inserted, the more the outgoing signal is time-expanded. As a matter of fact, the device would operate with no delays at all in the z(0), z(1), z(2) and z(3) lines but this would be undesirable since the object is to time-stretch the outgoing signal so that the increased detection capability of a long-pulse radar system can be achieved.

It should also be noted that the number of delay stages in the ISEM 13, although they may be as few as one, can be greatly increased in order to time-expand the outgoing signal.

The outputs of the FSTDM 21 are a series of complex signals carried on composite leads comprising separate I (inphase) and Q(quadrature) leads. A single signal with a real and an imaginary part is formed for each clocking interval. These signals are fed to a phase modulator 52 which phase-modulates the carrier signal of the transmitter, and the modulated carrier is propagated into space by the antenna.

The return signals are received, processed by the receiver 60, and fed to a sampler-and-A/D converter 62 which returns them to sample digital form.

These digital echo signals are in complex form and are fed to a conjugator circuit 64 which processes them to form their complex conjugates. These conjugate signals are fed back through the ISEM 13 in inverted order relative to the manner in which the original input pulse passed through the ISEM 13. The delayed outputs are again fed to the weighting means 20 whose output signals are fed to the Fourier signal time-dispersion means (FSTDM) 21 to provide delays for the signals s(0), s(1), s(2) and s(3) which are inverted in order relative to the delays provided by the FSTDM 21 for the outgoing weighting means signals. The output of the FSTDM 21 is a cross-correlated signal which is then detected by an envelope detector 36.

Complex conjugator 64, input-signal expansion means 13, weighting means 20, and time-dispersion means 21 comprise a matched filter. A matched filter provides an impulse response which is the complex-conjugate, time-inverted, equivalent of the input pulse. The conjugator 64 provides the complex conjugation of the echo signals and the expansion means 13 and time-dispersion means 21 provide the time inversion of the echo signal. The matched filter also effects convolution of the received signals with the input signal.

According to the present invention, the weighting means 20 comprising a fast Fourier (FFT) circuit 68, which forms discrete Fourier transform (DFT) signals; a first plurality of phase-shifters 69–71 of which a respective phase shifter is connected to every input of the DFT 68 except the first input; and a second plurality of phase-shifters 72–73 of which a respective phase shifter is connected to every output of the DFT 68. The first plurality of phase-shifters 69–71 and the input to the first delay stage 14 provide outputs x(n) in accordance with the formula $$x(n) = y(n)e^{-j\pi N(N-1)/N}$$

In the formula, the y(n) are the output signals taken from the input to delay stage 14 and from the outputs of delay stages 14, 16 and 18; n is the number of the output signal being taken from the delay stages (n=0 for the output signal taken from the input to delay stage 14, and n=1,2,3 for the output sigals taken from the outputs of delay stages 14, 16 and 18, respectively); and N is the number of delay stages plus one, since a pulse is being taken off just prior to the first stage 14. The output signals x(n) are individually fed to the DFT 68 which provides outputs s(k) in accordance with the formula $$s(k) = \sum_{n=0}^{N-1} x(n)e^{j2\pi nk/N}$$

In the formula, k is the number of the output signal being taken from the DFT 68. Every output of the DFT 68 is shifted in phase by the second plurality of phase-shifters 72–75, so that the outputs z(k) of the weighting means 20 are provided to the FSTDM in accordance with the formula $$z(k) = s(k)e^{-j\pi[k-(\frac{1}{2})(N-1)](N-1)/N}$$

In the example shown n=0, ... 3, k=0, ... 3, N=4, although many more delay stages and outputs from the weighting means could be used, as well as fewer. In fact, as little as one delay stage could be used. The phase shifts associated with phase shifters 69–71 are $-3\pi/4$, $-6\pi/4$, and $-9\pi/4$ respectively. The phase shifts associated with phase shifters 72–75 are $9\pi/8$, $3\pi/8$, $-3\pi/8$ and $-9\pi/8$ respectively. A detailed discussion of the discrete Fourier transform can be read in "Digital Signal Processing", Oppenheim and Schafer, published in 1975 by Prentice-Hall, Inc., Englewood Cliffs, N.J. Various ways of implementing the DFT are shown; in particular, see Chap. 6, FIG. 6.10.

The operation of the present invention may be explained as follows:

|  | The y outputs from the ISEM (13) are | | | |
|---|---|---|---|---|
|  | y(0) | y(1) | y(2) | y(3) |
| 1st clock pulse: | 1 | 0 | 0 | 0 |
| 2nd clock pulse: | 0 | 1 | 0 | 0 |
| 3rd clock pulse: | 0 | 0 | 1 | 0 |
| 4th clock pulse: | 0 | 0 | 0 | 1 |
| 5th etc. clock pulse: | 0 | 0 | 0 | 0 |

|  | The x inputs to the DFT are | | | |
|---|---|---|---|---|
|  | x(0) | x(1) | x(2) | x(3) |
| 1st clock pulse: | 1 | 0 | 0 | 0 |
| 2nd clock pulse: | 0 | $e^{-j3\pi/4}$ | 0 | 0 |
| 3rd clock pulse: | 0 | 0 | $e^{-j6\pi/4}$ | 0 |
| 4th clock pulse: | 0 | 0 | 0 | $e^{-j9\pi/4}$ |

|  | The s outputs from the DFT are | | | |
|---|---|---|---|---|
|  | s(0) | s(1) | s(2) | s(3) |
| 1st clock pulse: | 1 | 1 | 1 | 1 |
| 2nd clock pulse: | $e^{-j3\pi/4}$ | $e^{-j\pi/4}$ | $e^{j\pi/4}$ | $e^{j3\pi/4}$ |
| 3rd clock pulse: | $e^{j\pi/2}$ | $e^{-j\pi/2}$ | $e^{j\pi/2}$ | $e^{-j\pi/2}$ |
| 4th clock pulse: | $e^{-j\pi/4}$ | $e^{-j3\pi/4}$ | $e^{j3\pi/4}$ | $e^{j\pi/4}$ |

The z outputs from the weighting means are

-continued

|  | z(0) | z(1) | z(2) | z(3) |
|---|---|---|---|---|
| 1st clock pulse: | $e^{j9\pi/8}$ | $e^{j3\pi/8}$ | $e^{-j3\pi/8}$ | $e^{-j9\pi/8}$ |
| 2nd clock pulse: | $e^{j3\pi/8}$ | $e^{j\pi/8}$ | $e^{-j\pi/8}$ | $e^{-j3\pi/8}$ |
| 3rd clock pulse: | $e^{-j3\pi/8}$ | $e^{-j\pi/8}$ | $e^{j\pi/8}$ | $e^{j3\pi/8}$ |
| 4th clock pulse: | $e^{-j9\pi/8}$ | $e^{-j3\pi/8}$ | $e^{j3\pi/8}$ | $e^{j9\pi/8}$ |

These outputs are fed to the phase modulator 52 through the FSTDM delays. For the first four clock pulses, the only inputs to the modulator are the signals on the z(0) line; for the next four clock pulses, the signals on the z(1) line; for the next four, the signals on the z(2) line; and for the next four, the signals on the z(3) line. This signal modulates the phase of the transmitter carrier wave. Note that the output signals extends over 16 clock pulse periods. The phase-modulated carrier is propagated through space and, if the signal strikes a target, an echo signal is returned. This echo signal is processed through the receiver 60 and sent through a sampler-and-A/D converter circuit 62 which converts the phase-modulated carrier into a digitized signal again. The complex conjugate of the digitized signal is taken and fed to the ISEM 13, but the ISEM delays are now in time-inverted order, that is, y(3) now has no delay, y(2) is delayed one clock interval, y(1) two clock intervals and y(0) three clock intervals. The time-inverted, delayed echo signals are fed through the weighting means 20 to the FSTDM 21 to provide delays which are inverted in order relative to the delays provided by the FSTDM 21 for the outgoing weighting means signals. Thus, no delay is inserted in signal z(3), four units of delay in z(2), eight units of delay in z(1), and twelve units of delay in z(0). The output of the FSTDM 21 has a peak pulse in the sixteenth clock pulse interval, which can be seen in the output of the envelope detector 36.

Thus, there has been provided, for use with the P2 code, a new and improved digital pulse-expander-compressor. that requires a minimum amount of hardware.

Obviously many modifications and variations of the present invention are possible in light of the above teachings. For example, amplitude weightings at the outputs of the DFT can be used if desired to reduce the sidelobe levels of the P2 code. It is therefore to be understood that within the scope of the appended claims the invention may be practiced otherwise than as specifically described.

What is claimed as new and desired to be secured by Letters Patent of the United States is:

1. A digital pulse-expander-compressor comprising:
    pulse coder means for providing a series of weighted pulses from a single input pulse, the time interval of the series being greater than that of the input pulse, the coder means including weighting means; and
    pulse compression means of the matched-filter type for receiving and processing echo signals corresponding to the output signals of the coder means, the pulse compression means including weighting means which is the same weighting means as that employed in the coder means,
    the improvement comprising said weighting means includes a discrete Fourier transform circuit; a first plurality of phase-shifters, a respective phase-shifter being connected to every input of the discrete Fourier transform circuit except the first input; and a second plurality of phase-shifters, a respective phase-shifter of the second plurality being connected to every output of the discrete Fourier transform circuit.

2. The compressor recited in claim 1, wherein:
    the coder means includes an input-signal expansion means (ISEM) into which the input signal is fed, the ISEM comprising at least one delay stage.

3. The compressor recited in claim 2 wherein:
    each of the first plurality of phase shifters is connected to a respective output of the delay stages, and the first input of the discrete Fourier transform circuit is directly connected to the input of the first delay stage; and
    the first plurality of phase shifters and the connection to the input to the first delay stage provide inputs x(n) to the discrete Fourier transform circuit in accordance with the formula $$x(n) = y(n)e^{-j\pi n(N-1)/N}$$

where the y(n) are the output signals taken from the input to the first delay stage and from the outputs of the other delay stages; n is the number of the output signal being taken from the delay stages, n=0 for the signal corresponding to the input of the first stage and n=1,2, ... for the signals corresponding to outputs of consecutive other stages; and N is the number of delay stages plus one.

4. The compressor recited in claim 3 wherein:
    the discrete Fourier transform circuit provides outputs s(k) in accordance with the formula $$s(k) = \sum_{n=0}^{N-1} x(n)e^{j2\pi nk/N}$$

where k=0, 1, 2, ... is the number of the output signal from the transform circuit.

5. The compressor recited in claim 4 wherein:
    the second plurality of phase shifters provide outputs Z(k) in accordance with the formula $$Z(k) = s(k)e^{-j\pi[k-(\frac{1}{2})(N-1)](N-1)/N}$$

6. The compressor recited in claim 1, wherein the coder means includes:
    an input-signal expansion means (ISEM) into which the input pulse signal is fed, the ISEM comprising at least one delay stage; and
    a time-dispersion means (TDM) to which the outputs of the weighting means are fed for spreading the series of weighted pulses over a still greater time interval.

7. The compressor recited in claim 6 wherein the matched filter comprises:
    means for obtaining the complex conjugate of a signal corresponding to the coded output signal of the coder means, it being permissible for the coded signal and the corresponding signal to differ in phase;
    signal expansion means corresponding to the ISEM, the conjugated signal being processed through the signal expansion means in time-inverted order relative to the processing of the input pulse signal through the ISEM, the output signals of the signal expansion means being fed to the weighting means; and
    time-dispersion means corresponding to the TDM, the output signals of the weighting means being fed to the time-dispersion means, to provide delays for the signals which are inverted relative to the delays provided by the TDM for the outgoing weighting means signals.

* * * * *